United States Patent [19]

Shibata

[11] 4,325,846

[45] Apr. 20, 1982

[54] ADSORBENT MATERIALS FOR OILS AND FATS

[76] Inventor: Kozo Shibata, 72, Aza-Oka, Sasabe, Kawanish-City, Hyogo, Japan

[21] Appl. No.: 116,948

[22] Filed: Jan. 30, 1980

[51] Int. Cl.³ .............................................. B01J 20/12
[52] U.S. Cl. ............................... 252/455 R; 252/430; 252/477 R
[58] Field of Search ................ 252/455 R, 477 R, 430

[56] References Cited

U.S. PATENT DOCUMENTS

| | | | |
|---|---|---|---|
| 3,207,699 | 9/1965 | Harding et al. | 252/430 |
| 3,467,602 | 9/1969 | Koester | 252/455 R |
| 3,484,371 | 12/1969 | Biegler et al. | 252/430 X |
| 3,526,602 | 9/1970 | Kobayashi et al. | 252/477 R |
| 3,862,963 | 1/1975 | Hoshi et al. | 252/430 X |
| 3,960,521 | 6/1976 | Kruppa et al. | 252/430 X |
| 3,981,976 | 9/1976 | Stevens | 252/430 X |
| 4,039,480 | 8/1977 | Watson et al. | 252/455 R |
| 4,206,080 | 6/1980 | Sato et al. | 252/430 |
| 4,213,882 | 7/1980 | Kranich, Jr. | 252/455 R |

*Primary Examiner*—Carl F. Dees
*Attorney, Agent, or Firm*—Armstrong, Nikaido, Marmelstein & Kubovcik

[57] ABSTRACT

A porous adsorbent material for oils and fats consisting essentially of a sintered product of a basic composition consisting of a mixture of silica and clay having an infinite number of continuous, open pores formed therein, and a hydrophobic treatment thereon.

8 Claims, 4 Drawing Figures

ADSORBENT MATERIALS FOR OILS AND FATS

BACKGROUND OF THE INVENTION

The present invention relates to porous absorbent materials for absorbing oils and fats in water.

Split crude oil or a variety of waste oils contained in waste waters discharged from petrochemical plants, petroleum refineries, iron works, shipbuilding yards and other sources float or are contained in a state of emulsion in fresh or sea water, and constitute pollutants of rivers, streams and oceans. Furthermore, such oily substances in some cases tend to cohere and precipitate or settle after being maintained in the floating condition for a certain period of time. They thus exert adverse effects on organisms living on the bottoms of rivers and the sea, while they continue to be kept in the sediments semipermanently. In view of the above, development of appropriate treatment processes for oils and fats in water is urgently needed.

Under these circumstances, it is deemed the most effective to eliminate such oils and fats while they are in the hydrated condition before they cohere and settle. A great number of processes for eliminating oils and fats have been conventionally developed in the past.

By way of example, a process for eliminating oils and fats floating over the surface of the sea water has actually been adopted for commercial use which comprises allowing mat-shaped, fibrous materials to float on the surface of the sea water, contacting the oils and fats to permit adequate impregnation of the mats therewith. The mats exhibit a certain degree of adsorption for oils and fats and are composed of chemical fibers. However, the process has certain disadvantages once the mats have adsorbed the oils and fats, such as release of adsorbed oils and fats from the mats, evolution of toxic gases during incineration of such mats and damaging of an incinerator due to higher burning temperatures while incinerating the mats.

The porous adsorbent material for oils and fats according to the present invention has been developed with the specific aim of solving the above-mentioned problems so far encountered. Additionally, the present invention is less expensive and is easier to handle.

SUMMARY OF THE INVENTION

The present invention has for its object the provision of a porous adsorbent material for oils and fats which exhibits excellent adsorption capacity for oils and fats, is easy to mold and handle, and can be regenerated for recycled use.

The present invention, so as to achieve the hereinbefore described objects, comprises a porous adsorbent material for oils and fats having the following composition and construction. That is to say, the adsorbent material, being formed to the desired shape in accordance with its final application purpose and place and other conditions, is composed mainly of a sintered product of silica and clay, wherein an infinite number of continuous, open pores are formed on said sintered product and are subjected to a hydrophobic treatment.

DETAILED DESCRIPTION OF THE INVENTION

Figure 1:
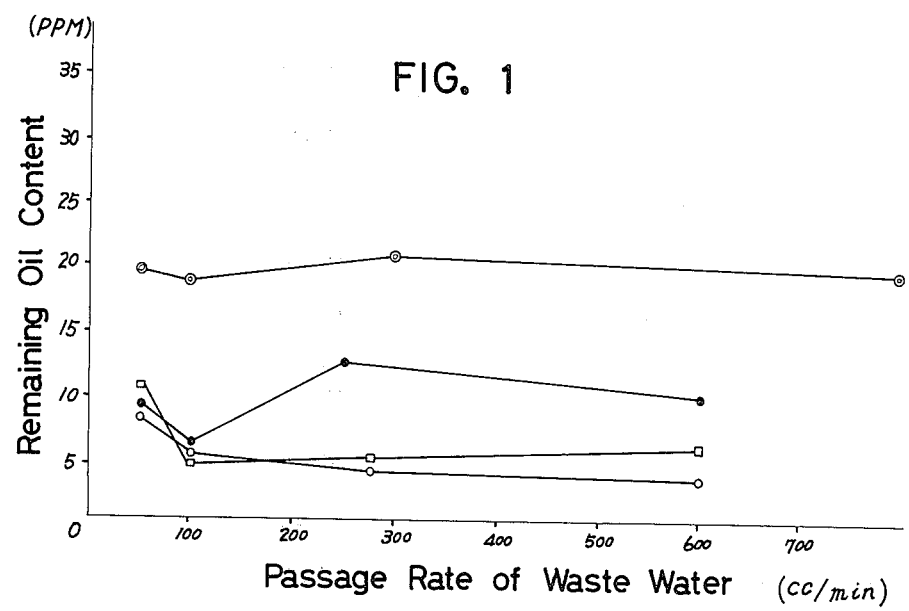
FIG. 1 is a graph representing a remaining oil content in a water sample containing a fixed concentration of oil measured in relation to a passage rate at which the water sample is passed through a determined amount of the adsorbent material of the present invention.

The porous adsorbent material for oils and fats according to the present invention, developed with a specific view to the excellent adsorption capacity for oils and fats, ease of molding and handling and regeneration for recycled use, is composed mainly of a sintered product of a mixture of silica and clay, whereby an infinite number of continuous, open pores imparted with a hydrophobic treatment are formed on said sintered product.

Referring now in more detail to the present invention, the compositions of silica and clay, which are raw materials for a sintered product, the main component for the adsorbent material, have great influence upon physical properties of adsorbent material resulting therefrom through sintering. These materials, in fact, vary to some extent depending upon their place of origin. In producing a sintered product from a mixture of silica and clay, silica and clay having the compositions shown respectively in the hereinafter mentioned tables, or such a clay as may have a content of aluminum oxide not more than three times that of silican oxide, which is adjusted in grain size (e.g., to 250 to 300 mesh) and in formulation ratio, are preferable.

TABLE 1

| COMPOSITIONS OF SILICA AND CLAY, IN PERCENT BY WEIGHT | | | |
|---|---|---|---|
| Silica: | | Clay: | |
| $SiO_2$ | 96.00 | $SiO_2$ | 40.0 |
| $Al_2O_3$ | 1.09 | $Al_2O_3$ | 40.0 |
| $Fe_2O_3$ | 0.15 | $Fe_2O_3$ | 0.8 to 0.9 |
| $K_2O$ | 1.50 | CaO | 0.7 |
| Loss[1] | 0.26 | MgO | 0.55 |
| | | Loss[1] | 12.0 |

REMARKS:
[1] "Loss" stands for ignition loss upon sintering.

An infinite number of continuous, open pores in the sintered product are formed during sintering of the aforementioned basic composition consisting of silica and clay by the burning off of previously added pore-forming materials. Examples of the pore-forming materials which are useful for this purpose may include materials (e.g., sawdust, rice hulls, etc.) that can be easily mixed for dispersion with the aforementioned basic composition and burnt off completely at a sintering temperature of the basic composition to form continuous, open pores and may have the particle size to be determined by taking into consideration the desired diameter, shape and extent of continuity of pores to be formed.

More specifically, a mud-formed basic composition produced by adding an appropriate portion of water (e.g., 3 to 4.5 times by weight that of the basic composition) to the basic composition is admixed for dispersion with an aforementioned pore-forming material (e.g., 100 to 140 parts by weight), and molded to a desired shape. The admixture is sintered at increased temperatures after forced or air drying to thus form the sintered product, as well as turn off the pore-forming material to produce an infinite number of continuous, open pores. In this case, the amount of the pore-forming material used is determined by taking into consideration desired properties of resulting continuous open pores (e.g., water-penetrating property) and specific gravity of adsorbent material to be produced, etc. The amount of pore-forming material used is suitably in the range of 1 to 1.4 times that of the basic composition. Furthermore, the pores formed in this way are subjected to a hydrophobic treatment with a hydrophobic agent such as a silicone-based water repellent agent to impart the lipophilic property or enhance the adsorption effect for oils and fats.

As an example of producing the adsorbent material for oils and fats according to the present invention, the following is presented:

EXAMPLE 500 kg of silica, 500 kg of clay (one of which contains 40% by weight of $SiO_2$ and 40% by weight of $Al_2O_3$), 1000 kg of sawdust and 3500 kg of water are weighed. The silica and clay are charged into a Pot mill and mixed. The sawdust as a pore-forming material is then added and mixed until a uniform dispersion is obtained. Mixing is continued while the water is added, until the mud state is produced. The basic composition, having thus been made mud-formed, is poured in a mold. The mold is air-dried for five days and force-dried for one day at about 130° C. to effect demolding. Molded products being thus dried are placed in a burning furnace and, after the temperature is gradually increased, sintered at the temperature of 1350° to 1370° C. maximum for one hour. After the temperature is allowed to decrease, the sintered products are taken from the furnace and, after being cooled, immersed in a 0.2% aqueous solution of a hydrophobic agent (silicone-based water repellent agent). This is followed by drying and heating at 130° to 300° C. for not less than two hours to complete the treatment. By the above procedure, thre is obtained the adsorbent material according to the present invention.

The adsorbent material according to the present invention produced under the aforementioned conditions exhibits the specific gravity and composition as described below and can be used as an adsorbent material for oils and fats present in liquids. Results of experiments with said adsorbent material are illustrated in FIGS. 1-4 attached hereto.

| Specific gravity: | | 0.25 to 0.35 |
|---|---|---|
| Composition: | $SiO_2$ | 68.00 (% by weight) |
| | $Al_2O_3$ | 21.00 |
| | $Fe_2O_3$ | 0.56 |
| | $K_2O$ | 1.50 |
| | CaO | 0.70 |
| | MgO | 0.55 |

Figure 2:
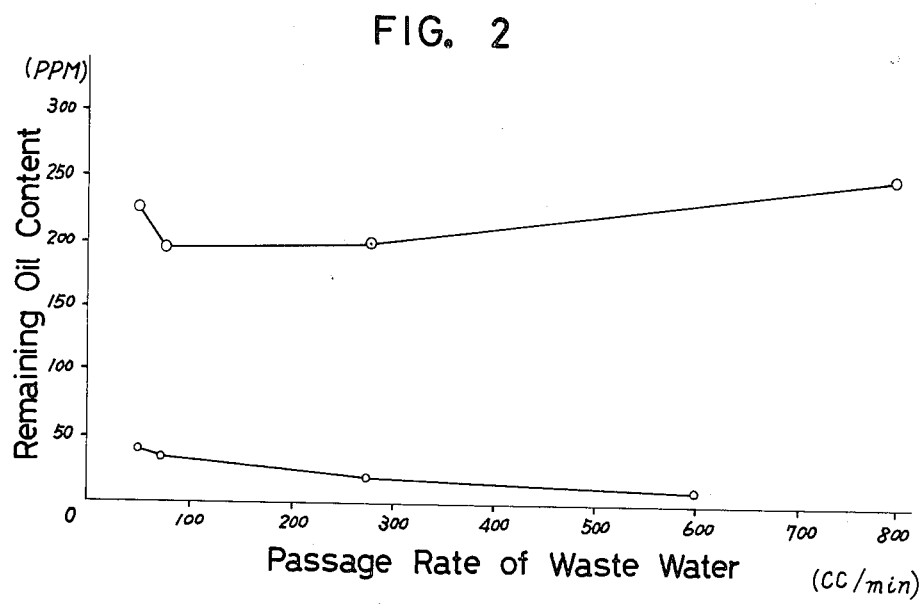
FIG. 2 is a graph showing a remaining oil content in a water sample containing a fixed concentration of oil as described in FIG. 1 in relation to a passage rate at which the water sample is passed through the adsorbent material according to the present invention and pearlite-based adsorbent using equal quantities of each.
Figure 3:
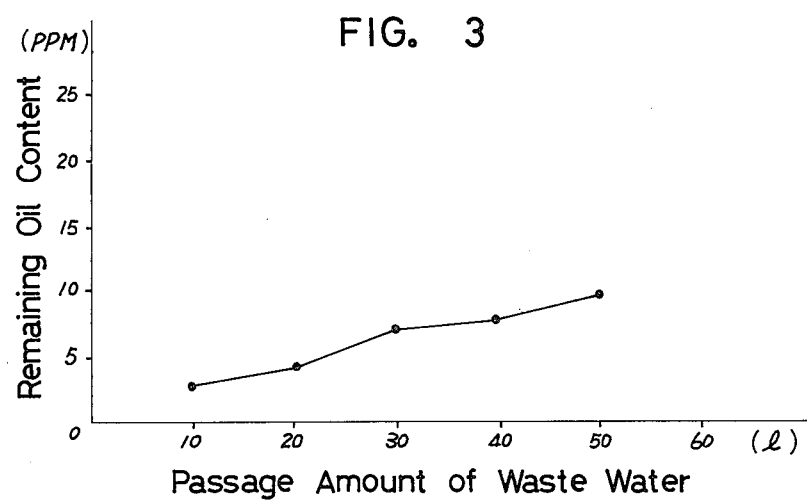
FIG. 3 is a graph showing a remaining oil content in a water sample containing a fixed concentration of oil in relation to a passage amount with which the water sample is passed through a determined amount of the adsorbent material at a constant rate.

In the Experiment (1), the remaining oil contents in a water sample containing a fixed concentration of an oil were measured with varying passage rates at which the sample water was passed through a determined amount of adsorbent material (80 g). The results obtained are shown in the graphs of FIGS. 1 and 2. In FIG. 1, the water sample employed was composed of water containing 100 ppm of an oil produced by adding 1 cc of an oil to 10 liters of water. The signs ●, ○, and □, as shown in the graphs, designate types of oils mixed into water samples; ● represents data obtained with heavy oil A, ○ those with olive oil, and □ those with gasoline. The sign ⊚ designates the data obtained with the experiment in which heavy oil A wasemployed as the oil in the water sample for comparatively testing the adsorbent material according to the present invention and another adsorbent (based on pearlite subjected to a hydrophobic treatment).

As can be seen from FIG. 1, the adsorbent material according to the present invention reduces the remaining oil content to not more than about 13 ppm in all of the cases of heavy oil A, olive oil and gasoline, and shows a great difference of about b 10 to 15 ppm in the case of heavy oil A, as compared with the case of a pearlite adsorbent material. These findings indicate that the adsorbent material according to the present invention posesses a very high adsorption capacity for oils and fats.

The graphs in FIG. 2 are graphs showing comparative data with regard to the remaining oil contents obtained in experiments in which the water sample consisted of water containing 3000 ppm of heavy oil A prepared by adding 30 cc of heavy oil A to 10 liters of water. The sample was passed through equal quantities of the adsorbent material according to the present invention and the pearlite-based adsorbent material at varying rates (80 g). In the graphs, the signs ○ and ○ designate the adsorbent material according to the present invention and the pearlite-based one, respectively.

FIG. 2 shows that the adsorbent material according to the present invention, noting the 150 to 230 ppm of the difference in the remaining oil content from the pearlite adsorbent material, possesses the very high adsorption capacity for oily substances.

In the Experiment (2), remaining oil contents were measured with varying passage amounts of the water sample, when a water sample with a fixed concentration of oil was passed through a determined amount of the adsorbent material according to the present invention (80 g). The results obtained are shown in graphs of FIG. 3. In this case, the water sample consisted of water containing 100 ppm of heavy oil A prepared by adding 5 cc of heavy oil to 50 liters of water, and its average passage rate was set at about 600 cc/min.

Figure 4:
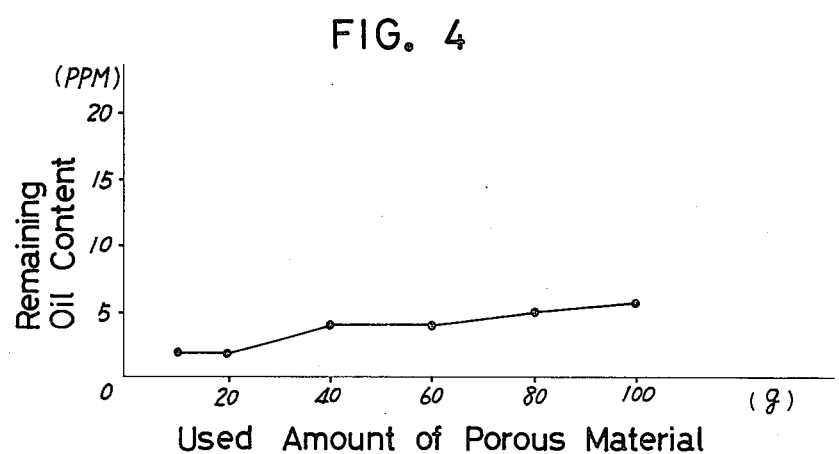
FIG. 4 is a graph representing a remaining oil content in a water sample in relation to an amount used of the adsorbent material according to the present invention.

In the Experiment (3), the remaining oil contents were measured in relation to the amounts of previously-used adsorbent material according to the present invention in an amount of adsorbent totalling 10~100 g. The results obtained are illustrated in the graphs of FIG. 4. In this case, the water sample consisted of water containing 100 ppm of heavy oil A prepared by adding 1 cc of heavy oil to 10 liters of water, while its average passage rate was set at about 500 cc/min.

The porous adsorbent material for oils and fats according to the present invention, which may be produced by the above procedure, has a highly excellent adsorption capacity for oils and fats as compared with pearlite-based adsorbent material for oils and fats as shown in FIGS. 1 and 2. Furthermore, said adsorbent material with its lowered specific gravity can be allowed to float on the surface of water for its uses and thus ensures adsorption of oils and fats in advance of cohesion and settlement.

In contrast with the foregoing example where a clay with 40% each of $Al_2O_3$ and $SiO_2$ contents wasutilized, a sintered product, prepared under the same conditions as the foregoing example with a clay containing three times more $SiO_2$ than $Al_2O_3$ has inadequate pore formation as compared with the one obtained in the foregoing example, and turns out to be of no commercial value as the adsorbent material.

Refering to the basic composition composed of silica and clay, silica and clay are preferably used in the proportion of 50:50 in parts by weight. However, a satisfactory adsorbent material according to the present invention can be produced with a mixing ratio of silica and clay as may be selected from about 65 to 35 parts by weight of silica and about 35 to 65 parts by weight of clay to make the total to 100 parts by weight.

By way of example, when the basic composition is formed of 70 parts by weight of silica and 30 parts by weight of clay, the resultant sintered product cannot be kept in a desired shape and it is not suitable as a porous adsorbent material for oils and fats. When the basic composition is formed of 30 parts by weight of silica and 70 parts by weight of clay, the resultant sintered product, though it can be provided with the desired shape, for example, brick-like, shows poor pore formation and large specific gravity and exhibits a deteriorated adsorption capacity for oils and fats.

More specifically, 30 kg of silica, 70 kg of clay and 100 kg of sawdust were mixed with 400 kg of water, sintered in the same manner as in the foregoing example, and subjected to a hydrophobic treatment. This produced a resultant product that exhibited poorer pore formation and a reduced adsorption capacity for oils and fats, thus lacking commercial value. In contrast, the mixtures comprising 65 kg of silica 35 kg of clay and 100 kg of sawdust with 400 kg of water and consisting of 35 kg of silica, 65 kg of clay and 100 kg of sawdust with 400 kg of water, when subjected to the same treatment as described in the foregoing example, produced sintered products which can retain a desired shape. It is further found that the adsorbent material derived from the former possesses the adsorption capacity almost equalto the one obtained in the first example, while the one derived from the latter showing the adsorption capacity corresponding to 80% of that of the one obtained in the first example, thus being usable as a commercial product.

Sawdust is employed as the pore-forming material in the foregoing example, which is desirably used in such a proportion as it, with a reduced water content, may be nearly equal in weight to the basic composition or, with an increased water content, it may be about 1.4 times as much as the basic composition.

What is claimed:

1. A porous adsorbent material for oils and fats which consists of a sintered product produced by admixing with water a mixture composed of about 65–35 parts by weight of silica, and about 35 to 65 parts by weight of clay at such a proportion as the total is 100 parts by weight and pore-forming material capable of being burnt off at a temperature of not more than a sintering temperature for silica and clay, the water being 300–450 parts by weight, thereby making a mud-formed mixture, molding the mud-formed mixture to a desired-shape, drying the molded shape, sintering the dried shape at the sintering temperature, whereby continuous open pores are formed, and treating the sintered product with a silicone-based water repellent agent.

2. A porous adsorbent material in accordance with claim 1 wherein clay having a content of $SiO_2$ three times or less than that of $Al_2O_3$ is utilized.

3. A porous adsorbent material in accordance with claim 2 wherein clay having 40% each of the $SiO_2$ and $Al_2O_3$ is utilized.

4. A porous adsorbent material in accordance with claim 1 wherein sawdust is utilized as a pore-forming material.

5. A porous adsorbent material in accordance with claim 1 wherein said mixture is admixed with 100 to 140 parts by weight of sawdust and adding 300 to 450 parts by weight of water.

6. A porous adsorbent material in accordance with claim 5 wherein said mixture is formed by mixing 50 parts by weight each of silica and clay prepared in advance and 100 parts by weight of dried sawdust with water.

7. A porous adsorbent material in accordance with claim 1 wherein the sintering temperature is in the range of 1300° to 1400° C.

8. A porous adsorbent material in accordance with claim 1, wherein the step of treating is by immersing the sintered product into an aqueous bath of the silicone-based water repellent agent and drying the product.

* * * * *